United States Patent
Lee et al.

(10) Patent No.: US 12,119,449 B2
(45) Date of Patent: Oct. 15, 2024

(54) NON-AQUEOUS ELECTROLYTE SOLUTION ADDITIVE FOR LITHIUM SECONDARY BATTERY, AND NON-AQUEOUS ELECTROLYTE SOLUTION FOR LITHIUM SECONDARY BATTERY AND LITHIUM SECONDARY BATTERY WHICH INCLUDE THE SAME

(71) Applicant: LG Energy Solution, Ltd., Seoul (KR)

(72) Inventors: Jung Min Lee, Daejeon (KR); Young Min Lim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 487 days.

(21) Appl. No.: 17/601,764

(22) PCT Filed: Apr. 16, 2020

(86) PCT No.: PCT/KR2020/005115
§ 371 (c)(1),
(2) Date: Oct. 6, 2021

(87) PCT Pub. No.: WO2020/213962
PCT Pub. Date: Oct. 22, 2020

(65) Prior Publication Data
US 2022/0209294 A1    Jun. 30, 2022

(30) Foreign Application Priority Data
Apr. 18, 2019 (KR) .................. 10-2019-0045583

(51) Int. Cl.
H01M 10/0567 (2010.01)
C07F 7/08 (2006.01)
H01M 10/0568 (2010.01)
H01M 10/0569 (2010.01)

(52) U.S. Cl.
CPC ......... *H01M 10/0567* (2013.01); *C07F 7/081* (2013.01); *H01M 10/0568* (2013.01); *H01M 10/0569* (2013.01); *H01M 2300/0028* (2013.01)

(58) Field of Classification Search
CPC ......... H01M 10/0567; H01M 10/0568; H01M 10/0569
See application file for complete search history.

(56) References Cited

U.S. PATENT DOCUMENTS

| | | |
|---|---|---|
| 2009/0301867 A1 | 12/2009 | Farkas et al. |
| 2010/0248021 A1 | 9/2010 | Park et al. |
| 2014/0322596 A1 | 10/2014 | Shatunov et al. |
| 2014/0356735 A1 | 12/2014 | Pena Hueso et al. |
| 2015/0010811 A1 | 1/2015 | Egorov et al. |
| 2016/0190644 A1* | 6/2016 | Takase .............. H01M 10/0569 429/341 |
| 2016/0351946 A1 | 12/2016 | Pena Hueso et al. |
| 2017/0018803 A1* | 1/2017 | Wang ................ H01M 10/0525 |
| 2017/0125845 A1 | 5/2017 | Yu et al. |
| 2018/0076477 A1 | 3/2018 | Pena Hueso et al. |
| 2020/0203770 A1 | 6/2020 | Kim et al. |
| 2022/0181674 A1 | 6/2022 | Pena Hueso et al. |

FOREIGN PATENT DOCUMENTS

| | | |
|---|---|---|
| CN | 105428701 A | 3/2016 |
| CN | 109336917 A | 2/2019 |
| JP | 3390327 B2 | 3/2003 |
| JP | 2011174001 A | 9/2011 |
| KR | 20130061232 A | 6/2013 |
| KR | 20140127741 A | 11/2014 |
| KR | 20150006364 A | 1/2015 |
| KR | 20160039484 A | 4/2016 |
| KR | 20170018975 A | 2/2017 |
| KR | 20170028676 A | 3/2017 |
| KR | 20170051286 A | 5/2017 |
| WO | 2018004219 A2 | 1/2018 |
| WO | 2019050160 A1 | 3/2019 |

OTHER PUBLICATIONS

Extended European Search Report and European Search Opinion for European Application No. 20790605.8 dated Apr. 13, 2022, 5 pgs.
International Search Report for PCT/KR2020/005115 dated Jul. 23, 2020. 2 pgs.

* cited by examiner

*Primary Examiner* — Kenneth J Douyette
(74) *Attorney, Agent, or Firm* — Lerner David LLP

(57) ABSTRACT

An additive for a non-aqueous solution of a lithium secondary battery, a non-aqueous electrolyte solution including the same, and a lithium secondary battery include the same are disclosed herein. In some embodiments, an additive is a compound represented by Formula 1. The additive may suppress dissolution of transition metal by forming a stable film on a surface of a positive electrode. A lithium secondary battery including the non-aqueous electrolyte solution having the additive has improved swelling and capacity characteristics at high voltage and during high-temperature storage because dissolution of metallic impurities causing failure in the battery is suppressed.

10 Claims, No Drawings

NON-AQUEOUS ELECTROLYTE SOLUTION ADDITIVE FOR LITHIUM SECONDARY BATTERY, AND NON-AQUEOUS ELECTROLYTE SOLUTION FOR LITHIUM SECONDARY BATTERY AND LITHIUM SECONDARY BATTERY WHICH INCLUDE THE SAME

CROSS-REFERENCE TO RELATED APPLICATIONS

The present application is a national phase entry under 35 U.S.C. § 371 of International Application No. PCT/KR2020/005115, filed on Apr. 16, 2020, which claims priority from Korean Patent Application No. 10-2019-0045583, filed on Apr. 18, 2019, the disclosures of which are incorporated by reference herein.

TECHNICAL FIELD

The present invention relates to a non-aqueous electrolyte solution additive for a lithium secondary battery, which may suppress dissolution of transition metal by forming a stable film on a surface of a positive electrode, and a non-aqueous electrolyte solution for a lithium secondary battery and a lithium secondary battery which include the same.

BACKGROUND ART

There is a need to develop technology for efficiently storing and utilizing electrical energy as personal IT devices and computer networks are developed with the recent development of information society and the accompanying dependency of society as a whole on the electrical energy is increased.

Particularly, studies of electricity storage devices, such as electric double-layer capacitors and non-aqueous electrolyte solution secondary batteries represented by lithium ion batteries, have been extensively conducted as an interest in solving environmental problems and realizing a sustainable circular society emerges.

Among them, since the lithium ion batteries may be miniaturized to be applicable to a personal IT device and have high operating voltage and energy density, the lithium ion batteries have been used in electric vehicles and power storage devices as well as power sources of notebook computers and mobile phones. These lithium ion batteries are promising because they have higher energy density than a lead battery or nickel-cadmium battery and high capacity may be achieved.

However, the lithium ion battery has a limitation in that the capacity of the battery decreases with charge/discharge cycles.

Thus, as a method of suppressing the decrease in the capacity of the battery with charge/discharge cycles, a method of adding various additives to an electrolyte solution has been studied.

The additive forms a film called a solid electrolyte interphase (SEI) on a surface of an electrode while being decomposed during initial charge and discharge. Since the SEI is formed during initial charge/discharge cycles, no electricity is consumed for the decomposition of a solvent and lithium ions may travel to and from the electrode through the SEI. That is, the formation of the SEI may play a large role in improving battery characteristics, storage characteristics, or load characteristics by preventing degradation of the electricity storage device, such as the non-aqueous electrolyte solution secondary battery, when charge/discharge cycles are repeated.

A surface structure of a positive electrode collapses due to a side reaction between a non-aqueous electrolyte solution and the positive electrode while the film formed on the surface of the electrode degrades when the battery is operated under high-voltage and high-temperature conditions, and, as a result, transition metal ions included in the positive electrode may be dissolved into the non-aqueous electrolyte solution.

As described above, in a case in which an amount of metallic impurities in the battery is increased, the metallic impurities may be re-deposited on the positive electrode to cause an increase in resistance of the positive electrode, or, in contrast, may be transferred to a negative electrode through the electrolyte solution and then electro-deposited on the negative electrode to grow as dendrites, and, eventually, it causes an internal short-circuit of the battery. Also, the metallic impurities are known as factors to consume lithium ions or increase interfacial resistance of the negative electrode while promoting an additional electrolyte solution decomposition reaction by destructing the SEI that gives passivation ability to the negative electrode.

Thus, there is a need to develop a non-aqueous electrolyte solution with a new configuration which may prevent a low-voltage failure and the resulting degradation of battery lifetime by suppressing the dissolution of positive electrode transition metals when the battery is operated under high-voltage and high-temperature conditions.

PRIOR ART DOCUMENT

Korean Patent Application Laid-open Publication No. 2017-0018975

DISCLOSURE OF THE INVENTION

Technical Problem

An aspect of the present invention provides a non-aqueous electrolyte solution additive for a lithium secondary battery which may suppress dissolution of transition metal by forming a stable film on a surface of a positive electrode.

Another aspect of the present invention provides a non-aqueous electrolyte solution for a lithium secondary battery which includes the non-aqueous electrolyte solution additive.

Another aspect of the present invention provides a lithium secondary battery including the non-aqueous electrolyte solution for a lithium secondary battery.

Technical Solution

According to an aspect of the present invention, there is provided a non-aqueous electrolyte solution additive for a lithium secondary battery which is a compound represented by Formula 1:

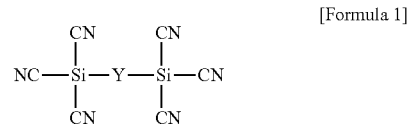

[Formula 1]

in Formula 1,
Y is a substituted or unsubstituted alkylene group having 1 to 10 carbon atoms.

According to another aspect of the present invention, there is provided a non-aqueous electrolyte solution for a lithium secondary battery which includes a lithium salt, a non-aqueous organic solvent, and the non-aqueous electrolyte solution additive for a lithium secondary battery.

According to another aspect of the present invention, there is provided a lithium secondary battery including the non-aqueous electrolyte solution for a lithium secondary battery.

Advantageous Effects

A compound represented by Formula 1, which is used as a non-aqueous electrolyte solution additive for a lithium secondary battery of the present invention, is a compound containing at least one cyano group in its structure, wherein, since it may form a stable film on a surface of a positive electrode to prevent dissolution of transition metal and suppress a side reaction between the positive electrode and an electrolyte solution, an amount of metallic impurities in the battery may be reduced.

Accordingly, if a non-aqueous electrolyte solution for a lithium secondary battery including the non-aqueous electrolyte solution additive for a lithium secondary battery is used, a lithium secondary battery having improved battery swelling and capacity characteristics during high-voltage and high-temperature storage may be achieved.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a lithium ion battery, high-temperature storage characteristics are improved because a film having passivation ability is formed on surfaces of a negative electrode and a positive electrode while a non-aqueous electrolyte solution is decomposed during initial charge and discharge. However, capacity may be reduced due to a loss of metallic elements while dissolution of the transition metal elements occurs in the positive electrode as the film degrades during high-voltage and high-temperature storage. Also, transition metal ions thus dissolved are not only electrodeposited on the negative electrode reacting in a strong reduction potential range to consume electrons, but also destruct a solid electrolyte interphase (SEI) during the electrodeposition. As a result, since the surface of the negative electrode is exposed to cause an additional electrolyte decomposition reaction, irreversible capacity may eventually be increased and capacity of a cell may be continuously reduced.

Thus, the present invention aims at providing a non-aqueous electrolyte solution additive, which may reduce an amount of metallic impurities in the battery by preventing the dissolution of the transition metals and suppressing a side reaction between the positive electrode and the electrolyte solution through the formation of a stable film on the surface of the positive electrode, and a non-aqueous electrolyte solution including the same. Also, the present invention aims at providing a lithium secondary battery in which battery swelling and capacity characteristics during high-voltage and high-temperature storage are improved by including the non-aqueous electrolyte solution.

Non-Aqueous Electrolyte Solution Additive for Lithium Secondary Battery

First, the present invention aims at providing a non-aqueous electrolyte solution additive which may form a passivation film able to protect the surface of the positive electrode at a high voltage on the surface of the positive electrode and has an excellent adsorption effect with metallic foreign matter by containing at least one cyano group.

That is, in the present specification, provided is a compound represented by the following Formula 1 as the non-aqueous electrolyte solution additive for a lithium secondary battery:

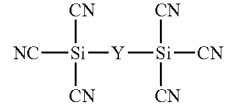

[Formula 1]

in Formula 1,
Y may be a substituted or unsubstituted alkylene group having 1 to 10 carbon atoms.

In this case, in Formula 1, Y may be a substituted or unsubstituted alkylene group having 2 to 8 carbon atoms, and, specifically, may be a substituted or unsubstituted alkylene group having 4 to 8 carbon atoms.

More specifically, the compound represented by Formula 1 may include at least one selected from the group consisting of compounds represented by Formulae 1a to 1c below.

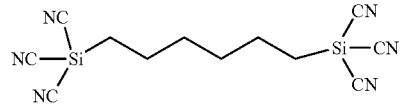

[Formula 1a]

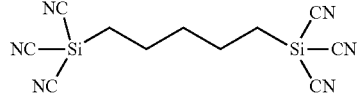

[Formula 1b]

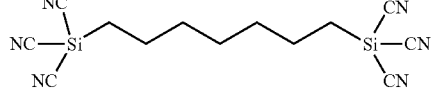

[Formula 1c]

Since the compound represented by Formula 1 contains at least one polar cyano group (i.e., —CN, nitrile group) having a high dipole moment at both ends in its structure, it forms a complex structure or ligand by forming a stronger bond with the surface of the positive electrode at high temperatures, and thus, it may form a stable ion conductive film on the surface of the positive electrode.

Particularly, the cyano group has a high tendency to adsorb to ions of metals, such as cobalt (Co), manganese (Mn), or nickel (Ni), dissolved from the positive electrode due to a repeated charge and discharge process of the battery or chemical dissolution reaction of the electrolyte solution, or adsorb to metallic foreign matter incorporated from raw materials or during a preparation process. Thus, with respect to a compound having a structure in which at least one cyano group is substituted into a silicon element as in the compound represented by Formula 1, for example, a structure containing three —CN end groups at each silicon (Si) atom based on a Si—CN bond that provides a stable chemical bond, since binding sites and binding energy with metal ions are increased in comparison to a nitrile-based compound used as a conventional additive, an effect of suppressing metal dissolution from the positive electrode, for example, an effect of suppressing generation of metal ions in the battery is excellent.

Thus, the compound represented by Formula 1 may suppress dissolution of metallic foreign matter from the positive electrode by forming a stable film on the surface of the positive electrode even if a small amount thereof is used, and, furthermore, may further improve battery swelling and capacity characteristics during high-voltage and high-temperature storage by suppressing generation of gas generated by the side reaction between the positive electrode and the electrolyte solution.

Furthermore, in addition to the adsorption of metal ions, unshared electrons of nitrogen (N) of the cyano group may stabilize anions of a salt to suppress the generation of HF due to the decomposition of the salt and to prevent precipitation of a portion of the dissolved transition metals on the surface of the negative electrode during high-temperature storage.

In the compound represented by Formula 1, it is preferable that a length of chain between the Si atom and the Si atom is 10 carbons or less. That is, in a case in which the chain length is greater than 10 carbons, there is a disadvantage that the compounds are agglomerated with each other to reduce solubility in an organic solvent. Thus, in Formula 1, in a case in which the length of the chain between the Si atom and the Si atom satisfies 1 to 10 carbons, since electron clouds become larger to increase electrostatic interaction with metal cations, the binding energy with the metal ions increases.

Non-Aqueous Electrolyte Solution for Lithium Secondary Battery

Also, an embodiment of the present invention may provide a non-aqueous electrolyte solution for a lithium secondary battery which includes the non-aqueous electrolyte solution additive of the present invention, a lithium salt, and a non-aqueous organic solvent.

(1) Non-Aqueous Electrolyte Solution Additive

The non-aqueous electrolyte solution of the present invention includes the above-described compound represented by Formula 1 as the non-aqueous electrolyte solution additive.

In this case, since a description of the non-aqueous electrolyte solution additive overlaps with that described above, the description thereof will be omitted.

However, in relation to an amount of the non-aqueous electrolyte solution additive, the compound represented by Formula 1, as the non-aqueous electrolyte solution additive, may be included in an amount of 0.1 wt % to 9 wt %, particularly 0.5 wt % to 5 wt %, and more particularly 1 wt % to 5 wt %, for example, 3 wt % to 5 wt % based on a total weight of the non-aqueous electrolyte solution for a lithium secondary battery.

In a case in which the compound represented by Formula 1 is included in an amount within the above range, a stable film may be formed on the surfaces of the negative electrode and the positive electrode, and an excellent metal dissolution suppression effect may also be achieved to prepare a secondary battery having more improved overall performance. If the amount of the compound represented by Formula 1 is less than 0.1 wt %, the metallic foreign matter in the battery may be removed, but, since it is difficult to continuously maintain its effect, the metallic foreign matter removal effect may be reduced over time. Also, if the amount of the additive is greater than 9 wt %, the metal dissolution suppression effect is improved, but, since a decrease in ionic conductivity due to an increase in viscosity of the non-aqueous electrolyte solution may adversely affect mobility of ions in the battery, rate capability or low-temperature life characteristics may be degraded.

Preferably, if the compound represented by Formula 1 is included in an amount of 0.5 wt % to 5 wt %, particularly 1 wt % to 5 wt %, and more particularly 3 wt % to 5 wt %, an optimum metal dissolution suppression effect and an effect of suppressing an increase in the metallic foreign matter in the battery may be achieved more effectively while suppressing a decrease in capacity and an increase in resistance due to the side reaction as much as possible.

(2) Lithium Salt

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl)imide, $LiN(SO_2F)_2$), LiBETI (lithium bis(perfluoroethanesulfonyl)imide, $LiN(SO_2CF_2CF_3)_2$), and LiTFSI (lithium bis(trifluoromethanesulfonyl)imide, $LiN(SO_2CF_3)_2$) or a mixture of two or more thereof. In addition to them, a lithium salt typically used in an electrolyte solution for a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of the surface of the electrode.

If the concentration of the lithium salt is less than 0.8 M, an effect of improving low-temperature output and cycle characteristics during high-temperature storage of the lithium secondary battery is insignificant, and, if the concentration of the lithium salt is greater than 4.0 M, electrolyte solution impregnability may be reduced due to the increase in the viscosity of the non-aqueous electrolyte solution.

(3) Non-Aqueous Organic Solvent

The non-aqueous organic solvent may include at least one organic solvent selected from the group consisting of a cyclic carbonate-based organic solvent, a linear carbonate-based organic solvent, a linear ester-based organic solvent, and a cyclic ester-based organic solvent.

Specifically, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

Furthermore, in order to prepare an electrolyte solution having high ionic conductivity, the organic solvent may further include at least one ester-based organic solvent selected from the group consisting of a linear ester-based organic solvent and a cyclic ester-based organic solvent in addition to at least one carbonate-based organic solvent selected from the group consisting of the cyclic carbonate-based organic solvent and the linear carbonate-based organic solvent.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

Any organic solvent typically used in an electrolyte solution for a lithium secondary battery may be added and used without limitation as the organic solvent, if necessary. For example, at least one organic solvent selected from an ether-based organic solvent, an amide-based organic solvent, and a nitrile-based organic solvent may be further included.

(4) Additive for Forming SEI

Also, the non-aqueous electrolyte solution for a lithium secondary battery of the present invention may further include additives for forming a SEI in the non-aqueous electrolyte solution, if necessary, in order to prevent the occurrence of the collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

As a representative example, the additive for forming an SEI may include at least one additive for forming an SEI which is selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinylethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluoro(bisoxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound may include tetraphenylborate and lithium oxalyldifluoroborate.

The nitrile-based compound may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include triethanolamine or ethylene diamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$.

In a case in which vinylene carbonate, vinylethylene carbonate, or succinonitrile, among these additives for forming an SEI, is further included, a more robust SEI may be formed on the surface of the negative electrode during an initial activation process of the secondary battery.

In a case in which the $LiBF_4$ is included, high-temperature stability of the secondary battery may be improved by suppressing the generation of gas which may be generated due to the decomposition of the electrolyte solution at high temperature.

Two or more additives for forming an SEI may be mixed and used, and the additive for forming an SEI may be included in an amount of 0.01 wt % to 50 wt %, particularly, 0.01 wt % to 10 wt %, and preferably 0.05 wt % to 5 wt % based on the total weight of the electrolyte solution. If the amount of the additive for forming an SEI is less than 0.01 wt %, an effect of improving low-temperature output, high-temperature storage characteristics, and high-temperature life characteristics of the battery is insignificant, and, if the amount of the additive for forming an SEI is greater than 50 wt %, the side reaction in the electrolyte solution may excessively occur during charge and discharge of the battery. Particularly, if the excessive amount of the additives for forming an SEI is added, the additives for forming an SEI may not be sufficiently decomposed at high temperature so that they may be present in the form of an unreacted material or precipitates in the electrolyte solution at room temperature. Accordingly, a side reaction that degrades life or resistance characteristics of the secondary battery may occur.

Lithium Secondary Battery

Also, in another embodiment of the present invention, there is provided a lithium secondary battery including the non-aqueous electrolyte solution for a lithium secondary battery of the present invention.

After an electrode assembly, in which a positive electrode, a negative electrode, and a separator between the positive electrode and the negative electrode are sequentially stacked, is formed and accommodated in a battery case, the lithium secondary battery of the present invention may be prepared by injecting the non-aqueous electrolyte solution of the present invention.

The positive electrode, the negative electrode, and the separator, which are included in the lithium secondary battery of the present invention, may be prepared according to a conventional method known in the art and used, and are specifically the same as those described later.

(1) Positive Electrode

The positive electrode may be formed by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum.

Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement effect due to the control of types and content ratios of components constituting the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt %, based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene termonomer, a styrene-butadiene rubber, a fluoro rubber, various copolymers thereof, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x \leq 1$; $1 \leq y \leq 3$; $1 \leq z \leq 8$) may be used as the metal composite oxide.

The material, which may be doped and undoped with lithium, may include Si, $SiO_x$ ($0<x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

As the separator included in the lithium secondary battery of the present invention, a typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Non-aqueous Electrolyte Solution for Lithium Secondary Battery)

A non-aqueous electrolyte solution for a lithium secondary battery was prepared by adding 1 g of the compound represented by Formula 1a to 99 g of a non-aqueous organic solvent (ethylene carbonate (EC):propyl propionate (PP)= 3:7 volume ratio) in which 1.2 M $LiPF_6$ was dissolved (see Table 1 below).

(Lithium Secondary Battery Preparation)

A positive electrode active material ($LiCoO_2$), a conductive agent (carbon black), and a binder (polyvinylidene fluoride) were added to N-methyl-2-pyrrolidone (NMP) in a weight ratio of 97.5:1:1.5 to prepare a positive electrode slurry (solid content: 50 wt %). A 12 μm thick aluminum (Al) thin film, as a positive electrode collector, was coated with the positive electrode slurry, dried, and then roll-pressed to prepare a positive electrode.

A negative electrode active material (graphite), a binder (SBR-CMC), and a conductive agent (carbon black) were added to water, as a solvent, in a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly was accommodated in a pouch-type battery case, and the non-aqueous electrolyte solution for a lithium secondary battery was injected thereinto to prepare a pouch-type lithium secondary battery.

Example 2

A non-aqueous electrolyte solution was prepared in the same manner as in Example 1 except that the compound represented by Formula 1b was included instead of the compound represented by Formula 1a during the preparation of the non-aqueous electrolyte solution (see Table 1 below). Also, a lithium secondary battery including the same was prepared.

Example 3

A non-aqueous electrolyte solution was prepared in the same manner as in Example 1 except that the compound represented by Formula 1c was included instead of the compound represented by Formula 1a during the preparation of the non-aqueous electrolyte solution (see Table 1 below). Also, a lithium secondary battery including the same was prepared.

Example 4

A non-aqueous electrolyte solution was prepared in the same manner as in Example 1 except that 5.0 g of the compound represented by Formula 1a was added to 95 g of an organic solvent (ethylene carbonate(EC):propyl propionate (PP)=3:7 volume ratio) during the preparation of the non-aqueous electrolyte solution (see Table 1 below). Also, a lithium secondary battery including the same was prepared.

Example 5

A non-aqueous electrolyte solution was prepared in the same manner as in Example 1 except that 3.0 g of the compound represented by Formula 1a was added to 97 g of an organic solvent (ethylene carbonate(EC):propyl propionate (PP)=3:7 volume ratio) during the preparation of the non-aqueous electrolyte solution (see Table 1 below). Also, a lithium secondary battery including the same was prepared.

Example 6

A non-aqueous electrolyte solution was prepared in the same manner as in Example 1 except that 0.5 g of the compound represented by Formula 1a was added to 99.5 g of an organic solvent (ethylene carbonate(EC):propyl propionate (PP)=3:7 volume ratio) during the preparation of the non-aqueous electrolyte solution (see Table 1 below). Also, a lithium secondary battery including the same was prepared.

Example 7

A non-aqueous electrolyte solution was prepared in the same manner as in Example 1 except that 0.1 g of the compound represented by Formula 1a was added to 99.9 g of an organic solvent (ethylene carbonate(EC):propyl propionate (PP)=3:7 volume ratio) during the preparation of the non-aqueous electrolyte solution (see Table 1 below). Also, a lithium secondary battery including the same was prepared.

Example 8

A non-aqueous electrolyte solution was prepared in the same manner as in Example 1 except that 10 g of the compound represented by Formula 1a was added to 90 g of an organic solvent (ethylene carbonate(EC):propyl propionate (PP)=3:7 volume ratio) during the preparation of the non-aqueous electrolyte solution (see Table 1 below). Also, a lithium secondary battery including the same was prepared.

Comparative Example 1

A non-aqueous electrolyte solution was prepared in the same manner as in Example 1 except that a non-aqueous electrolyte solution additive was not included during the preparation of the non-aqueous electrolyte solution (see Table 1 below). Also, a lithium secondary battery including the same was prepared.

Comparative Example 2

A non-aqueous electrolyte solution was prepared in the same manner as in Example 1 except that succinonitrile was included instead of the compound represented by Formula 1a during the preparation of the non-aqueous electrolyte solution (see Table 1 below). Also, a lithium secondary battery including the same was prepared.

Comparative Example 3

A non-aqueous electrolyte solution was prepared in the same manner as in Example 1 except that a nitrile-based compound represented by the following Formula 2 was included instead of the compound represented by Formula 1a during the preparation of the non-aqueous electrolyte solution (see Table 1 below). Also, a lithium secondary battery including the same was prepared.

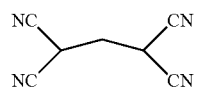

[Formula 2]

TABLE 1

| Sample name | Organic solvent | | Non-aqueous electrolyte solution additive | |
|---|---|---|---|---|
| | Mixing ratio | Amount added (g) | Formula | Amount added (g) |
| Example 1 | EC:PP = 3:7 volume ratio | 99 | 1a | 1 |
| Example 2 | EC:PP = 3:7 volume ratio | 99 | 1b | 1 |
| Example 3 | EC:PP = 3:7 volume ratio | 99 | 1c | 1 |
| Example 4 | EC:PP = 3:7 volume ratio | 95 | 1a | 5 |
| Example 5 | EC:PP = 3:7 volume ratio | 97 | 1a | 3 |
| Example 6 | EC:PP = 3:7 volume ratio | 99.5 | 1a | 0.5 |
| Example 7 | EC:PP = 3:7 volume ratio | 99.9 | 1a | 0.1 |
| Example 8 | EC:PP = 3:7 volume ratio | 90 | 1a | 10 |
| Comparative Example 1 | EC:PP = 3:7 volume ratio | 100 | — | — |
| Comparative Example 2 | EC:PP = 3:7 volume ratio | 99 | Succinonitrile | 1 |
| Comparative Example 3 | EC:PP = 3:7 volume ratio | 99 | 2 | 1 |

EXPERIMENTAL EXAMPLES

Experimental Example 1. Evaluation of Thickness Increase Rate after High-Temperature Storage An activation (formation) process was performed at 0.2 C rate on the lithium secondary batteries prepared in Examples 1 to 6 and the lithium secondary batteries prepared in Comparative Examples 1 to 3. Thereafter, gas in each battery was removed through a degassing process, a battery in an initial state was completed by performing a post-activation process in which each battery having gas removed therefrom was charged at 0.2 C rate to 4.45 V under a constant current/constant voltage condition at room temperature (25° C.) cut-off charged at 0.05 C, and then discharged at 0.2 C rate to 3.0 V. The charge and discharge process was performed using PNE-0506 charge/discharge equipment (manufacturer: PNE SOLUTION Co., Ltd.).

Subsequently, after each lithium secondary battery was constant current/constant voltage charged at 0.7 C rate to 4.45 V at room temperature (25° C.) and cut-off charged at 0.05 C under the same condition, a thickness before high-temperature storage of each lithium secondary battery was measured with a plate thickness gauge with a weight of 300 g. In this case, a method of measuring the thickness is performed in such a manner that each battery was put on the plate thickness gauge and a value appearing when the weight of 300 g was put on the battery was checked.

Subsequently, after the batteries were stored at high temperature by being left standing in an oven (OF-02GW, manufacturer: JEIO TECH. CO., LTD.) at 85° C. for 8 hours, each battery was taken out at room temperature and cooled for 24 hours, a thickness of each battery after high-temperature storage relative to the thickness of the battery before the high-temperature storage was then measured, and its absolute value and results of calculating an increase rate (%) are presented in Table 2 below.

TABLE 2

| Sample name | Non-aqueous electrolyte solution additive | | Thickness before high-temperature storage (mm) | Thickness after high-temperature storage (mm) | Thickness increase rate (%) |
|---|---|---|---|---|---|
| | Formula | Amount added (g) | | | |
| Example 1 | 1a | 1 | 3.201 | 3.517 | 9.87 |
| Example 2 | 1b | 1 | 3.191 | 3.526 | 10.50 |
| Example 3 | 1c | 1 | 3.205 | 3.511 | 9.55 |
| Example 4 | 1a | 5 | 3.218 | 3.509 | 9.04 |
| Example 5 | 1a | 3 | 3.209 | 3.515 | 9.54 |
| Example 6 | 1a | 0.5 | 3.203 | 3.578 | 11.70 |
| Comparative Example 1 | — | — | 3.195 | 4.186 | 31.02 |
| Comparative Example 2 | Succinonitrile | 1 | 3.202 | 3.626 | 13.24 |
| Comparative Example 3 | 2 | 1 | 3.203 | 3.925 | 22.54 |

As illustrated in Table 2, with respect to the secondary batteries of Examples 1 to 6, it may be understood that thickness increase rates after high-temperature storage were all excellent, at 12% or less.

In contrast, a thickness increase rate after high-temperature storage of the secondary battery of Comparative Example 1 including the non-aqueous electrolyte solution without an additive was 31% or more, wherein it may be understood that the thickness increase rate after high-temperature storage was significantly inferior to those of the secondary batteries of Examples 1 to 6.

Also, thickness increase rates after high-temperature storage of the secondary battery of Comparative Example 2, which included the non-aqueous electrolyte solution containing succinonitrile as a nitrile-based additive, and the secondary battery of Comparative Example 3, which included the non-aqueous electrolyte solution containing the compound represented by Formula 2, were 13.24% and 22.54%, respectively, wherein it may be understood that the thickness increase rates after high-temperature storage were inferior to those of the secondary batteries of Examples 1 to 6.

Experimental Example 2. Evaluation of Capacity after High-Temperature Storage

An activation (formation) process was performed at 0.2 C rate on the lithium secondary batteries prepared in Examples 1 to 6 and the lithium secondary batteries prepared in Comparative Examples 1 to 3. Thereafter, gas in each battery was removed through a degassing process, a battery in an initial state was completed by performing a post-activation process in which each battery having gas removed therefrom was charged at 0.2 C rate to 4.45 V under a constant current/constant voltage condition at room temperature (25° C.) cut-off charged at 0.05 C, and then discharged at 0.2 C rate to 3.0 V. In this case, the charge and discharge process was performed using PNE-0506 charge/discharge equipment (manufacturer: PNE SOLUTION Co., Ltd.).

Subsequently, after each lithium secondary battery was constant current/constant voltage charged at 0.7 C rate to 4.45 V at room temperature (25° C.) and cut-off charged at 0.05 C under the same condition, the batteries were stored at high temperature by being left standing in an oven (OF-02GW, manufacturer: JEIO TECH. CO., LTD.) at 85° C. for 8 hours. Thereafter, after each battery was taken out at room temperature and cooled for 24 hours, 3 cycles of constant current/constant voltage charging at 0.7 C rate to 4.45 V, cut-off charging at 0.05 C, and cut-off discharging at 0.2 C rate to 3.0 V were performed using the charge/discharge equipment, and discharge capacity in the last $3^{rd}$ cycle was measured. The discharge capacity obtained was expressed as a percentage (%) relative to theoretical design capacity (2210 mAh) of the corresponding cell and listed in Table 3 below.

TABLE 3

| Sample name | Capacity (mAh) after storage at 85° C. | Capacity retention (%) |
|---|---|---|
| Example 1 | 1975.5 | 89.4 |
| Example 2 | 1947.4 | 88.1 |
| Example 3 | 1936.2 | 87.6 |
| Example 4 | 1859.7 | 84.1 |
| Example 5 | 1918.6 | 86.8 |
| Example 6 | 1871.9 | 84.7 |
| Comparative Example 1 | 1628.8 | 73.7 |
| Comparative Example 2 | 1821.8 | 82.4 |
| Comparative Example 3 | 1656.6 | 75.0 |

As illustrated in Table 3, with respect to the secondary batteries of Examples 1 to 6, it may be understood that capacity retentions after high-temperature storage were all excellent, at about 84% or more.

In contrast, capacity retention after high-temperature storage of the secondary battery of Comparative Example 1 including the non-aqueous electrolyte solution without an additive was 73.7%, wherein it may be understood that the capacity retention after high-temperature storage was significantly inferior to those of the secondary batteries of Examples 1 to 6.

Also, capacity retentions after high-temperature storage of the secondary battery of Comparative Example 2, which included the non-aqueous electrolyte solution containing succinonitrile as a nitrile-based additive, and the secondary battery of Comparative Example 3, which included the non-aqueous electrolyte solution containing the compound represented by Formula 2, were 82.4% and 75.0%, respectively, wherein it may be understood that the capacity retentions after high-temperature storage were inferior to those of the secondary batteries of Examples 1 to 6.

Experimental Example 3. Evaluation of Metal (Co) Dissolution after High-Temperature Storage Each of the lithium secondary batteries prepared in Examples 1 to 8 and the lithium secondary batteries prepared in Comparative Examples 1 and 3 was charged at 0.7 C rate to 4.4 V under a constant current/constant voltage condition and cut-off charged at 0.05 C once, and stored in an oven at 85° C. for 8 hours.

Subsequently, after each of the secondary batteries stored at high temperature was disassembled and one sheet of the negative electrode was sampled, each sample was thoroughly washed with a dimethyl carbonate (DMC) solution, and the negative electrode active material was then scraped off and subjected to ICP analysis (ICP-OES (PERKIN-ELMER, OPTIMA 5300DV)). A concentration of cobalt (Co), which was dissolved from the positive electrode and reduced and electrodeposited on the negative electrode due to the degradation of the positive electrode and the side reaction with the electrolyte solution during high-temperature storage, was measured by the ICP analysis, and the results thereof are presented in Table 4 below.

TABLE 4

| | Non-aqueous electrolyte solution additive | | |
|---|---|---|---|
| Sample name | Formula | Amount added (g) | Co (mg/kg) |
| Example 1 | 1a | 1 | 845 |
| Example 2 | 1b | 1 | 860 |
| Example 3 | 1c | 1 | 825 |
| Example 4 | 1a | 5 | 770 |
| Example 5 | 1a | 3 | 785 |
| Example 6 | 1a | 0.5 | 912 |
| Example 7 | 1a | 0.1 | 1030 |
| Example 8 | 1a | 10 | 748 |
| Comparative Example 1 | — | — | 1650 |
| Comparative Example 3 | 2 | 1 | 1340 |

Referring to Table 4, with respect to the secondary batteries of Examples 1 to 8, it may be understood that amounts of Co dissolved after high-temperature storage were low at 1,030 mg/kg or less.

In contrast, an amount of Co dissolved after high-temperature storage of the secondary battery of Comparative Example 1 including the non-aqueous electrolyte solution without an additive was 1,650 mg/kg, wherein it may be understood that the amount of Co dissolved after high-temperature storage was significantly inferior to those of the secondary batteries of Examples 1 to 8.

Also, an amount of Co dissolved after high-temperature storage of the secondary battery of Comparative Example 3, which included the non-aqueous electrolyte solution containing the compound represented by Formula 2, was 1,340 mg/kg, wherein it may be understood that the amount of Co dissolved after high-temperature storage was inferior to those of the secondary batteries of Examples 1 to 8.

With respect to the secondary battery of Example 7 which included the non-aqueous electrolyte solution containing a trace amount of the additive, the amount of Co dissolved after high-temperature storage was 1,030 mg/kg, wherein the metal dissolution suppression effect was improved in comparison to those of Comparative Examples 1 and 3, but it may be understood that the concentration of metal dissolution was relatively increased in comparison to those of the secondary batteries of Examples 1 to 6 and 8.

Experimental Example 4. Evaluation of Electrolyte Solution Ionic Conductivity

In order to identify physical properties of the non-aqueous electrolyte solutions, ionic conductivities of the non-aqueous electrolyte solutions prepared in Examples 1, 4, 5, 6, and 8 were measured at 25° C. using a 5230 ionic conductivity meter by METTLER TOLEDO, and the results thereof are presented in Table 5 below.

TABLE 5

| Sample name | Non-aqueous electrolyte solution additive | | Ionic conductivity (mS/cm) |
| --- | --- | --- | --- |
| | Formula | Amount added (g) | |
| Example 1 | 1a | 1 | 8.14 |
| Example 4 | 1a | 5 | 7.65 |
| Example 5 | 1a | 3 | 7.97 |
| Example 6 | 1a | 0.5 | 8.21 |
| Example 8 | 1a | 10 | 6.88 |

Referring to Table 5, with respect to the non-aqueous electrolyte solution of Example 8, since the excessive amount of the additive was used, the viscosity of the non-aqueous electrolyte solution was increased, and thus, it may be understood that an ionic conductivity value was reduced in comparison to those of the non-aqueous electrolyte solutions prepared in Examples 1, 4, 5, and 6.

The invention claimed is:

1. An additive for a non-aqueous solution of a lithium secondary battery, wherein the additive is a compound represented by Formula 1:

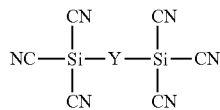

[Formula 1]

wherein, in Formula 1,

Y is a substituted or unsubstituted alkylene group having 1 to 10 carbon atoms.

2. The additive for a lithium secondary battery of claim 1, wherein, in Formula 1, Y is a substituted or unsubstituted alkylene group having 2 to 8 carbon atoms.

3. The additive for a lithium secondary battery of claim 1, wherein, in Formula 1, Y is a substituted or unsubstituted alkylene group having 4 to 8 carbon atoms.

4. The additive for a lithium secondary battery of claim 1, wherein the additive comprises at least one of compounds represented by Formulae 1a, 1b or 1c:

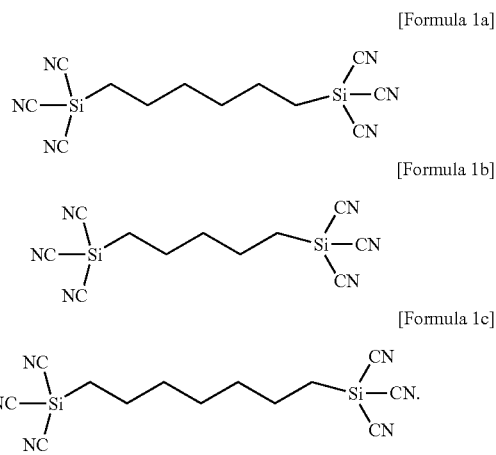

5. A non-aqueous electrolyte solution for a lithium secondary battery, the non-aqueous electrolyte solution comprising:
a lithium salt;
a non-aqueous organic solvent; and
the additive of claim 1.

6. The non-aqueous electrolyte solution for a lithium secondary battery of claim 5, wherein the additive is present in an amount of 0.1 wt % to 9 wt % based on a total weight of the non-aqueous electrolyte solution.

7. The non-aqueous electrolyte solution for a lithium secondary battery of claim 5, wherein the additive is present in an amount of 0.5 wt % to 5 wt % based on a total weight of the non-aqueous electrolyte solution.

8. The non-aqueous electrolyte solution for a lithium secondary battery of claim 5, wherein the additive is present in an amount of 1 wt % to 5 wt % based on a total weight of the non-aqueous electrolyte solution.

9. The non-aqueous electrolyte solution for a lithium secondary battery of claim 5, further comprising a second additive for forming a solid electrolyte interphase (SEI), wherein the second additive is at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

10. A lithium secondary battery comprising the non-aqueous electrolyte solution of claim 5.

* * * * *